United States Patent
Carson et al.

(10) Patent No.: US 7,440,449 B2
(45) Date of Patent: Oct. 21, 2008

(54) HIGH SPEED SWITCHING MODULE COMPRISED OF STACKED LAYERS INCORPORATING T-CONNECT STRUCTURES

(75) Inventors: John C. Carson, Corona Del Mar, CA (US); Volkan H. Ozguz, Aliso Viejo, CA (US)

(73) Assignee: Irvine Sensors Corp., Costa Mesa, CA (US)

( * ) Notice: Subject to any disclaimer, the term of this patent is extended or adjusted under 35 U.S.C. 154(b) by 861 days.

(21) Appl. No.: 10/960,712

(22) Filed: Oct. 6, 2004

(65) Prior Publication Data

US 2005/0058128 A1    Mar. 17, 2005

Related U.S. Application Data

(63) Continuation-in-part of application No. 09/973,857, filed on Oct. 9, 2001, now Pat. No. 6,829,237.

(60) Provisional application No. 60/274,120, filed on Mar. 8, 2001, provisional application No. 60/238,797, filed on Oct. 6, 2000.

(51) Int. Cl.
*H04L 12/28* (2006.01)
*H04L 12/56* (2006.01)
*H04L 29/00* (2006.01)
*H04L 39/00* (2006.01)

(52) U.S. Cl. ............ 370/386; 370/388; 370/389; 257/499; 257/661; 257/930; 340/2.6

(58) Field of Classification Search ........ 370/351, 370/355, 386, 388, 389, 390, 392, 412, 422, 370/419, 427; 257/661, 686, 930, 499; 340/2.25, 340/2.29, 2.6
See application file for complete search history.

(56) References Cited

U.S. PATENT DOCUMENTS

| | | | | |
|---|---|---|---|---|
| 5,016,138 A | * | 5/1991 | Woodman | 361/688 |
| 5,347,428 A | * | 9/1994 | Carson et al. | 361/760 |
| 5,424,920 A | * | 6/1995 | Miyake | 361/735 |
| 5,432,729 A | * | 7/1995 | Carson et al. | 365/63 |
| 5,541,914 A | * | 7/1996 | Krishnamoorthy et al. | 370/427 |
| 5,561,622 A | * | 10/1996 | Bertin et al. | 365/51 |
| 5,907,178 A | * | 5/1999 | Baker et al. | 257/433 |
| 5,963,554 A | * | 10/1999 | Song | 370/395.1 |
| 6,301,247 B1 | * | 10/2001 | Larson et al. | 370/387 |
| 6,427,037 B1 | * | 7/2002 | Okayama | 385/16 |
| 7,072,334 B2 | * | 7/2006 | Li | 370/388 |
| 7,106,728 B1 | * | 9/2006 | Li | 370/386 |
| 7,239,012 B2 | * | 7/2007 | Pepe et al. | 257/686 |

* cited by examiner

*Primary Examiner*—Chi H Pham
*Assistant Examiner*—Ahmed Elallam
(74) *Attorney, Agent, or Firm*—W. Eric Boyd

(57) ABSTRACT

A compact multi-stage switching network (100), and a router (510) incorporating such multi-stage switching network, adapted for simultaneously routing a plurality of data packets from a first plurality of input ports (110) to selected ones of a second plurality of output ports (190) comprising: a first stack (140) of IC switching layers (113) that are stacked in physical contact with one another, each IC switching layer containing at least one switching element circuit (142); a second stack (160) of IC switching layers (113) that are stacked in physical contact with one another, each IC switching layer (113) containing at least one switching element circuit (162); and interconnecting circuitry (150) that connects the first stack (140) of IC layers to the second stack (160) of IC layers to form the compact multi-stage switching network. The stacks (140, 160) are preferably mated to one another in a transverse fashion in order to achieve a natural full-mesh connection. Also contemplated are the use of superconducting IC switching circuits (142) and a suitable superconducting cooling housing (730), as permitted by the compact nature of the multi-stage switching network (100), in order to operate at high speed and low power.

3 Claims, 18 Drawing Sheets

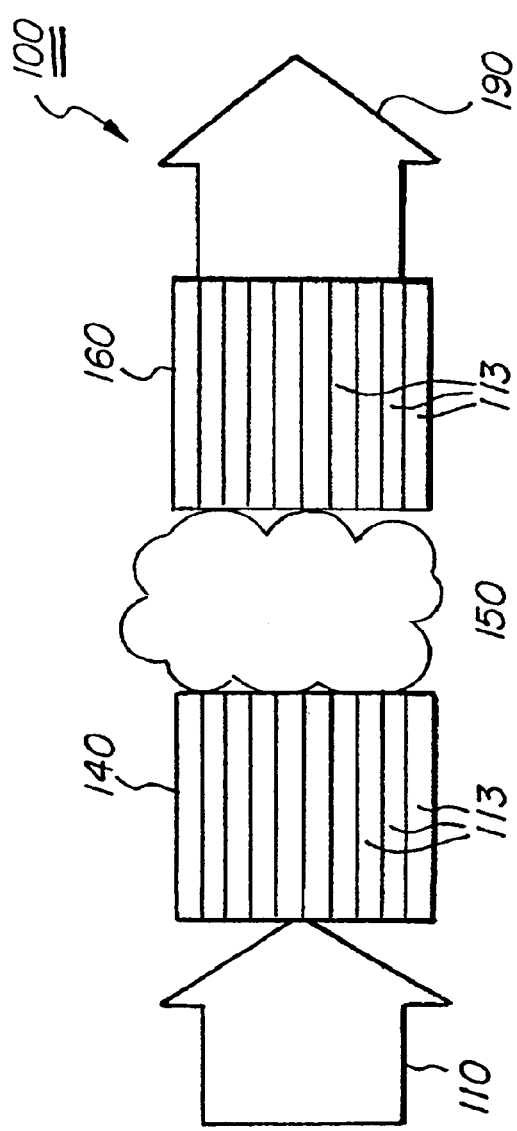
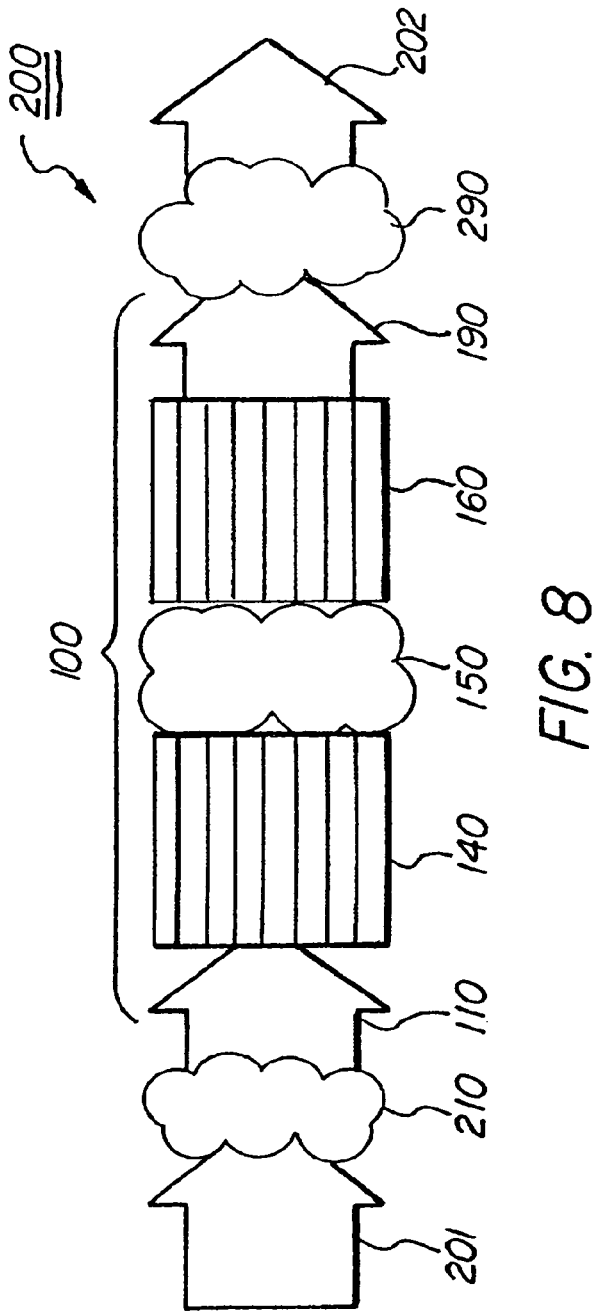

HIGH SPEED SWITCHING MODULE COMPRISED OF STACKED LAYERS INCORPORATING T-CONNECT STRUCTURES

REFERENCE TO RELATED APPLICATIONS

This patent application is a continuation in part of U.S. patent application Ser. No. 09/973,857 filed on Oct. 9, 2001, "High Speed Multi-Stage Switching Network Formed From Stacked Switching Layers", issued on Dec. 7, 2004 as U.S. Pat. No. 6,829,237, which in turn, claims the benefit of provisional patent application No. 60/238,797 filed on Oct. 6, 2000 and of provisional patent application No. 60/274,120 filed on Mar. 8, 2001.

BACKGROUND OF THE INVENTION

1. Field of the Invention

This invention relates generally to data switches and, more specifically, to a high speed multi-stage switching network formed from stacked switching layers for use in routers and the like.

2. Description of the Related Art

This invention relates to switches. A switch, in the most general sense relevant here, is a communications device that controls the routing of a signal path. Switches are generally categorized as packet switches or as circuit switches. Packet switches, also sometimes called datagram switches, switch packets containing both data and meta-data (control information). Some well-known packet switching devices are IP routers and asynchronous transfer mode (ATM) switches. As stated in RFC 1812, "An IP router can be distinguished from other sorts of packet switching devices in that a router examines the IP protocol header as part of the switching process. It generally removes the Link Layer header a message was received with, modifies the IP header, and replaces the Link Layer header for retransmission."

Circuit switches are devices that establish a dedicated channel for the duration of the transmission, thereby allowing data that is not accompanied by meta-data to be transmitted in real time. The public switched telephone network (PSTN) is a circuit-switched network. A telephone switch that is part of the PSTN is a prototypical circuit switch. This patent application will focus on packet switching devices, but a switch made in accordance with this invention is applicable to a circuit switching device as well.

In a data communications network that uses packet switching technology, data to be sent from one network interface to another is broken up into small chunks for transmission over the network. The individual data chunks are typically combined with suitable control information to form transmission units called "packets." The packets are usually self-contained in the sense that the packet itself carries the information needed for routing the packet to its intended destination. The destination information is part of the packet's control information.

Each packet generally has a header containing its source and destination, a block of data content sometimes called a payload, and an error-checking code. All the data packets related to a message may or may not take the same route to get to their destination; they may pass through different packet switches on the way to their final destination and they are all reassembled once they have arrived.

Some packet-switching protocols refer to the transmission units as "datagrams" or "frames" or "messages" or "cells". This application, however, will generically refer to all such transmission units as packets without regard to the actual format or specific name used by any particular protocol.

In the context of a packet switch, therefore, a switch is a networking device which can send packets directly to a port associated with a given network address, or destination address, contained in the packet.

FIG. 1 is a simplified block diagram of a switch 10 that forwards data arriving at one of its inputs 11 to one of its outputs 13. The core of a data switch, as shown by FIG. 1, is a so-called "switch fabric" 12 that routes data from an input port to an output port.

A "router" is a device that finds the best path for a data packet to be sent from one network to another. A router stores and forwards electronic messages between networks. A router generally picks the most expedient route to the destination address from among all possible paths based on the traffic load and the number of hops.

A router commonly incorporates a data switch and combines such switch with other complexities such as input buffers, output buffers, port mappers, schedulers for generating "switch commands", sorters and so on. FIG. 2 shows a simplified block diagram of a router 20 consisting of (1) a plurality of "line cards" 21 that each have one ore more network interfaces 22 to the attached networks, (2) an internal interconnection unit or data switch 10 that contains a "switch fabric" 12 as discussed above, and (3) a processing module 23.

The most common switch fabric technologies in use today are buses, shared memories, and crossbars.

Buses and Shared Memories

The simplest switch fabric 12 is a shared bus that operates in a time-division manner. In such case, multiple interface cards are connected to the bus and a microprocessor executes suitable software for performing the routing function. The microprocessor reads data from an input port connected to the bus, determines a "next hop" address by reading the packet's destination address and performing a look up operation in a routing table that is updated pursuant to suitable protocols, and then writes the data to the appropriate output port based on the next hop determination. The data is usually buffered in a common memory connected to the bus such that it must cross the bus twice in going from an input port to an output port.

While this simple bus-based, software controlled architecture is useful for a router with 10 megabits per second (Mbps) ports, and perhaps for a router with relatively few 100 Mbps ports, its capacity is limited in terms of data rate and port count. It is difficult to achieve wire-speed routing at higher data rates with this architecture because of bottlenecks associated with the shared bus, the memory's data transfer bandwidth, and the processor's clock speed. According to one author, "it is almost impossible to build a bus arbitration scheme fast enough to provide nonblocking performance at multi-gigabit speeds." Aweya, James, IP Router Architectures: An Overview, Nortel Networks, p. 30.

There are, of course, more efficient ways of operating with a bus-based switch fabric 12. For example, some designers have put "satellite" processors, route caches, and memory on the interface cards themselves to allow the cards to process packets locally and make their own routing decisions whenever possible.

Other bus-based architectures used multiple parallel "forwarding engines" that operate only on the destination header, the packet data being forwarded directly from an input interface card to an output interface card under the control of so-called forwarding engines. The packet's data payloads, in other words, is directly transferred from interface card to interface card.

Crossbars

A more advanced generation of routers was designed with a parallel connection switch fabric that operated in a space-division manner rather than a time-division manner. Such switch fabrics allowed data throughput to be increased by several orders of magnitude. A popular switch fabric of parallel connection construction is known as a crossbar switch.

FIG. 3 is a simplified block diagram of an N×N crossbar switch 112 implemented in crosspoint arrangement with switching elements located at each node or crosspoint 113. Data arriving on at inputs row is placed on an output column if the corresponding crosspoint 113 is active. FIG. 4 is a simplified block diagram of an N.times.N crossbar switch 212 that uses multiple N-to-1 demultiplexers 213, one for each of the N outputs. A full crossbar switch is desirable because every input port has a path to every output port such that there is no blocking at any input ports or inside of the switch. Blocking will only occur when two packets compete for the same output port.

Crossbar switches are conceptually desirable, but they have generally been regarded as physically impractical for large switches.

Crossbars usually have very low blocking probabilities, but they have a key defect: they require a lot of circuitry (proportional to n.sup.2 or worse) in each output port. Because costs grow quadratically with the number of ports, crossbar designs are generally suitable only for comparatively small switches.

Partridge, Craig. Gigabit Networking, Massachusetts: Addison-Wesley Publishing Company, 1994. Page 100.

In other words, prior art approaches to crossbar switches do not scale well such that they are generally regarded as useful only for small switches:

A cross bar is internally nonblocking (i.e., no sample is blocked in the switch waiting for an output line).

Unfortunately, an N.times.N crossbar uses N.sup.2 elements and therefore is expensive for large N, such as N=100, 000 *** However, crossbars are an excellent solution for building smaller (say, 8.times.8 or 64.times.64 switches).

Keshav, S., An Engineering Approach to Computer Networking: ATM Networks, the Internet and the Telephone Network, Massachusetts: Addison-Wesley Publishing Company, 1997. Page 168.

Prior art switches of larger dimension have generally been implemented as multistage switches comprising at least two stages and an interconnection from stage to stage according to a desired interconnection topology. A multistage switch, in other words, divides the inputs into groups that are internally switched by columns of switching elements consisting of smaller, full crossbar switches and ultimately outputs from a second column of smaller, full crossbar switches that serve as switching elements.

FIG. 5, for example, is a simple 16-port Banyan switching network 312 formed from two-stages or "columns" of 4.times.4 crossbar switching elements 313. As is well known, if the total number of ports is P (16), and the crossbar switching elements 313 are N.times.N (4.times.4), the switch fabric requires logN(P)*P/N (log4(16)*16/4=2*4=8) crossbar switching elements 313, organized as logN(P) (log4(16)=2) column of P/N (16/4=4) elements each. FIG. 5 further illustrates how a switch scheduler (not shown) may control the switching network by attaching a "switch command" or switch address header 314 on each arriving message 315. On each cycle of the switching network, as each stage of the switching network 312 is traversed by the messages, the switch address header 314 of each message locally controls each input port. The router, in other words, includes suitable means for responding to the switch command and routing the data packet through the multi-stage switching network to a second line card corresponding to the desired route. In the first stage, for example, the first two bits ("11") of the switch address header 314 instruct the switching element 313 to output the message 315 on port 3. The address bits for the first stage are deleted from the front of the switch address header 314. At the next stage, therefore, the first two bits ("10") instruct the switching element 313 in the second column to output the message on port 2. The final stage deletes the final two bits of the switch address header 314, leaving only the message 315.

The simple switching network 312 of FIG. 5 can have interior blocking, i.e. two messages addressed to different outputs can require the same interior connection. For example, in FIG. 5, if two messages addressed to outputs 1 and 2 were presented to different inputs on the upper-left switching element 313, they would both require the single connection between the upper-element 313 and the upper-right element 313. Assuming that the interior paths are the same speed as the external input and output ports, this situation would require one of the two messages to be deferred in a suitable buffer or dropped, even though there is no contention for the same output port.

FIG. 6 shows a three-stage switching network 412 that reduces the internal blocking problem associated with the two-stage switching network 312 of FIG. 5. The three-stage switching network 412 includes a third column 323 of switching elements 313 that, in combination with the first and second columns 321, 322, provides several additional paths to reach the same switching element 313 associated with different outputs. As shown in FIG. 6, for example, two messages addressed to outputs 1 and 2 that would be blocked in FIG. 5 can reach the upper-right switching element 313 in column 321 through different intermediate elements 313, 313 in the intermediate column 322. The scheduler (not shown), of course, must compute and then add an additional pair of bits 314 times to the switch address header 314 in order to suitably traverse the switching elements 313 in the extra column 323 and "route around" the blocking.

The particular two- and three-stage switching networks 312, 412 of FIGS. 5 and 6 have "full-mesh" interconnection patterns 331 between the columns. Other interconnection patterns are possible with two- and three-column switch networks. Moreover, switch fabrics with even more columns are possible, but the return on investment for each additional column is marginal.

The methodologies of design and operation of a scheduler that is suitable for implementing multi-stage switching network are well known and will not be discussed herein for the sake of brevity.

Multistage switching networks make it more practical to construct larger switches with smaller, readily available off-the-shelf parts. It is also possible and usually desirable, as shown by FIGS. 5 and 6, to use less switching elements than are required to implement a 100% non-blocking network. The number of 4.times.4 switching elements needed to implement a nonblocking 16-port switching network is sixteen elements, arranged in four stages of four. The groupings of signals through fewer stages providing less than the nonblocking number of switching elements introduces some small probability of internal blocking, but it is relatively small. The exact probability of blocking will vary as a function of traffic. A two-stage embodiment like that shown in FIG. 5 has a 25% probability of blocking with a random traffic pattern. The three-stage embodiment like that shown in FIG. 6 has only a 0.02% probability of blocking with the same pattern. The inventors believe that designers have come to regard crossbar switches as impractical for creating large switches because the implementing electronics would occupy a large area and have long interconnects. Even sub-100% multistage switching networks like those exemplified by FIGS. 5 and 6 have typically been built in such larger sizes from smaller building block switching elements packaged as discrete chips and those building block chips have heretofore been arranged as discrete components on a relatively large printed circuit board assembly (PCBA) and generally in a planar, two-dimensional manner. The problem is that the long interconnects exhibit parasitic losses that tend to make the switch relatively slow and inefficient at the same time that the switch must consume more power to overcome interconnect related losses.

Superconducting switching elements have been used to make switches because they offer relatively fast switching speeds and extremely low power consumption (e.g. those using Josephson junctions), as compared with switching elements of conventional electronic construction. It has not been practical until now, however, to use superconducting elements to make large switches with a large number of ports. Switching elements manufactured with conventional electronics are better operated in a distributed, large area environment when it comes to cooling. It is very impractical, however, to cool such a large area to superconducting temperatures of 120K (−243.67 degrees Fahrenheit) required for so-called "high-temperature superconductors" or, for that matter, to even lower temperatures such as 4K (−452.47 degrees Fahrenheit) required for other superconducting technologies.

A large multi-stage switch constructed from a planar arrangement of switching elements on a PCBA, therefore, is impractical because the assembly is physically large, operationally slow and, were it desired to do so, difficult to cool to superconducting temperatures. A large switch of conventional construction consumes excessive space because the physical size of the PCBA grows quadratically with the number of inputs and outputs. A large switch formed from building blocks of conventional construction would operate at less than optimal clock speeds because of increased signal latency due to parasitic loads present over long lines. A large switch of conventional construction would be difficult to implement with superconducting electronics with individual building blocks distributed over a relatively large PCBA because the relatively large size of the PCBA is not amenable to being cooled to superconducting temperatures, and because the PCBA layers and dissimilar materials are in contact with one another.

In summary, as a conventional crossbar switch grows with electronics of conventional construction, it becomes slower and burns more power due the parasitic losses associated with the growing length of interconnects. At the same time, the growing switch area becomes increasingly difficult to cool to the superconducting temperatures needed to implement the switch with high speed, low power electronics of superconducting construction.

There is a need, therefore, for a data switch that offer many ports (hundreds or thousands) while being compactly constructed with short interconnects and, preferably, for a data switch that operates at very high data rates (e.g. 15 Gb/s per port) and at very low power by being implemented with superconducting electronics and cooled to superconducting temperatures, and there is a need for a router that incorporates such a switch.

SUMMARY OF THE INVENTION

In a first aspect, the invention may be regarded as a compact multi-stage switching network adapted for simultaneously routing a plurality of data packets from a first plurality of input ports to selected ones of a second plurality of output ports comprising: a first stack of IC layers including a plurality of stacked IC switching layers that are stacked in physical contact with one another, each IC switching layer containing at least one switching element circuit; a second stack of IC chips including a plurality of stacked IC switching chips that are stacked in physical contact with one another, each IC switching layer containing at least one switching element; and means for interconnecting the interface conductors of the first stack of IC layers to the interface conductors of the second stack of IC layers to form the compact multi-stage switching network.

In a second aspect, the invention may be regarded as a compact multi-stage switching network adapted for simultaneously routing a plurality of data packets from a first plurality of input ports to selected ones of a second plurality of output ports comprising: a first stack of layers including a plurality of superconducting switching layers that are stacked in physical contact with one another and interface conductors on at least one surface thereof, each superconducting switching layer containing at least one superconducting switching element circuit; a second stack of layers including a plurality of superconducting switching layers that are stacked in physical contact with one another and interface conductors on at least one surface thereof, each superconducting switching layer containing at least one superconducting switching element circuit; means for interconnecting the interface conductors of the first stack of layers to the interface conductors of the second stack of layers to form a compact assembly; and means for cooling the compact assembly to a superconducting temperature.

In a third aspect, the invention may be regarded as a packet switching router adapted for forwarding data packets comprising: a plurality of line cards for receiving and transmitting data packets according to a desired protocol over a particular medium, a first line card inspecting destination data in the packet, selecting a desired route, and setting a switch command based on the desired route; a compact multi-stage switching network having a first stack of IC layers including a plurality of stacked IC switching layers that are stacked in physical contact with one another, each IC switching layer containing at least one switching element circuit; a second stack of IC chips including a plurality of stacked IC switching chips that are stacked in physical contact with one another, each IC switching layer containing at least one switching element; and means for interconnecting the interface conductors of the first stack of IC layers to the interface conductors of the second stack of IC layers to form the compact multi-stage switching network; and means for responding to the switch command and routing the data packet through the compact multi-stage switching network to a second line card corresponding to the desired route.

BRIEF DESCRIPTION OF THE DRAWINGS

The just summarized invention can be best understood with reference to the following description taken in view of the drawings of which:

FIG. 7 is a simplified schematic view of a compact multi-stage switching network according to a first preferred embodiment of the invention;

FIG. 8 is a simplified schematic view of an optical-electronic-optical (OEO) data switch built around the compact multi-stage switching network of FIG. 1;

FIGS. 9A-1 is an exploded perspective view of a first preferred means for interconnecting first and second stacks of IC switching layers consisting of a transverse mating between the layers;

FIGS. 9A-2 is a perspective view of a pair of transversely mated switching stacking according to the first preferred means for interconnecting of FIGS. 9A-1;

DETAILED DESCRIPTION OF SPECIFIC EMBODIMENTS

FIG. 7 shows a simplified block diagram of a high speed, compact, multi-stage switching network 100 according to a first preferred embodiment of this invention. The switching network 100 is, as shown, adapted for simultaneously routing a plurality of data packets from a first plurality of electronic data input ports 110 to selected ones of a second plurality of electronic data output ports 190.

Figure 10:
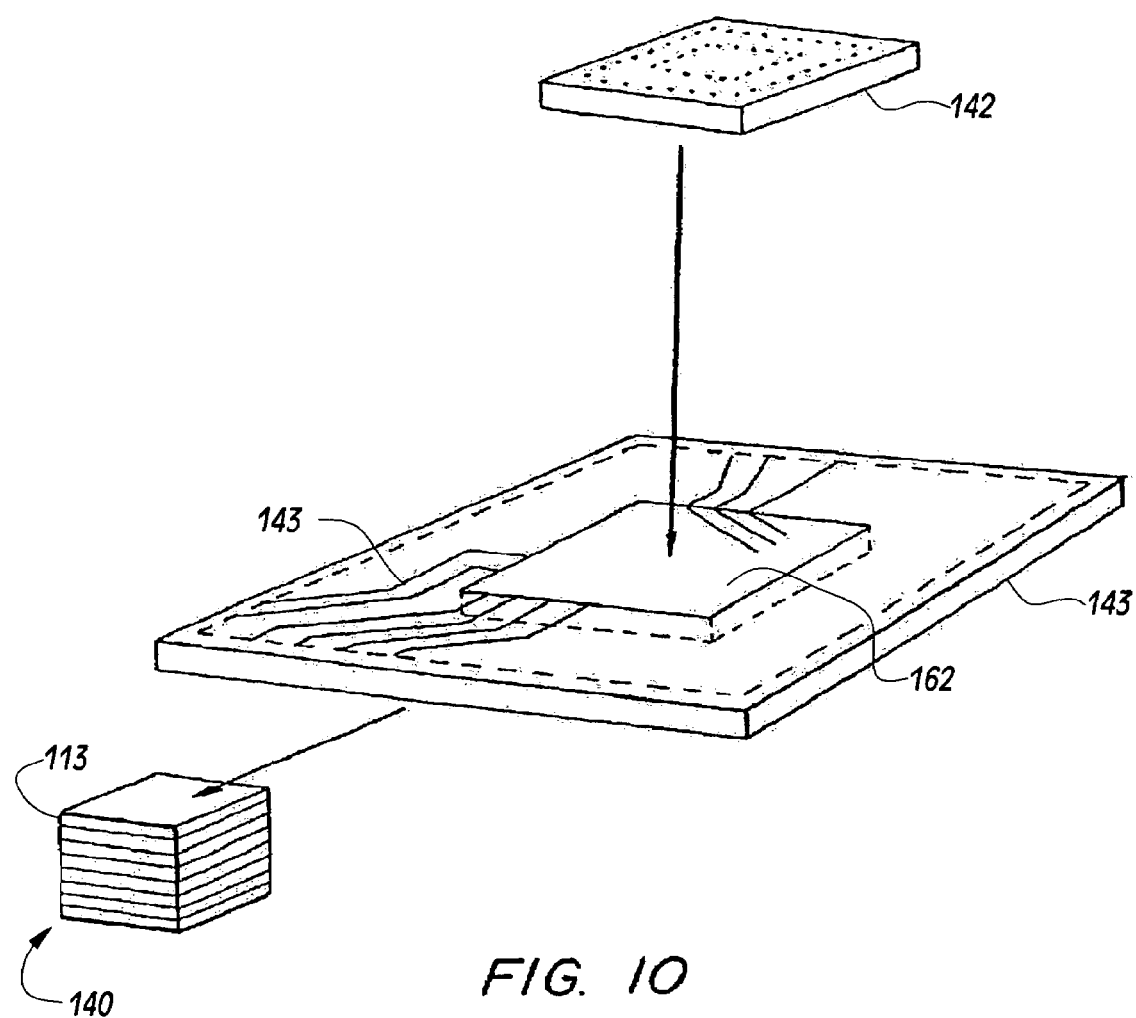
FIG. 10 is an exploded perspective view of a first preferred stack of IC switching layers, each IC switching layer being formed from an IC switching chip encapsulated in a "neo-frame" that has been processed to provide metallization suitable for stacking.

The compact switching network 100 of this first preferred embodiment is formed from first and second stacks 140, 160 of IC switching layers 113 that are stacked in physical contact with one another, each IC switching layer 113 containing at least one switching element circuit (see e.g. 142 of FIG. 10). The compact switching network 100 further comprises means 150 for interconnecting the interface conductors of the first stack 140 of IC layers to the interface conductors of the second stack 160 of IC layers to form the overall, compact multi-stage switching network 100.

Figure 5:
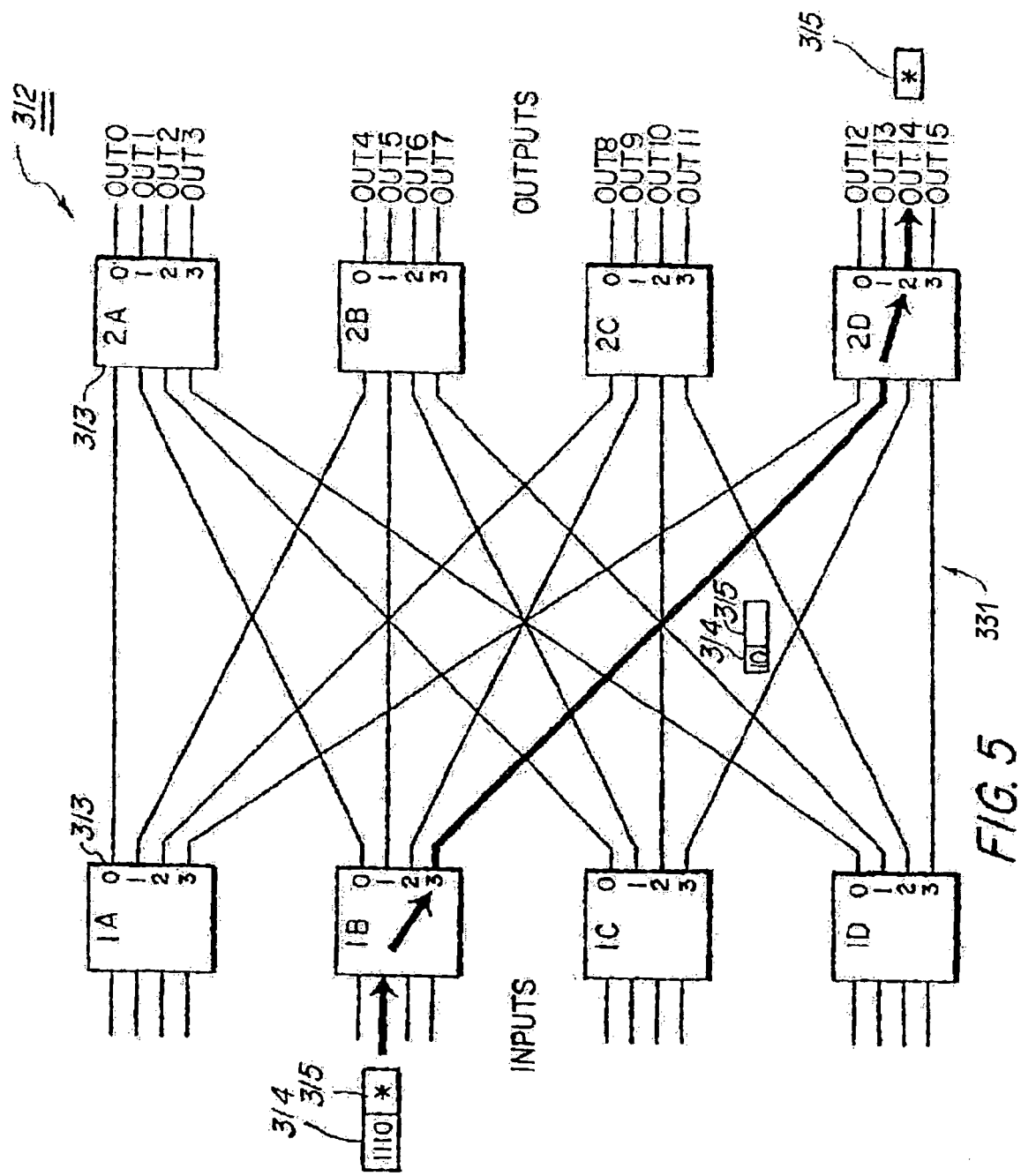
FIG. 5 is a block diagram of a simple 16-port Banyan switching network 312 formed from two-stages or "columns" of 4.times.4 crossbar switching elements 313.
Figure 6:
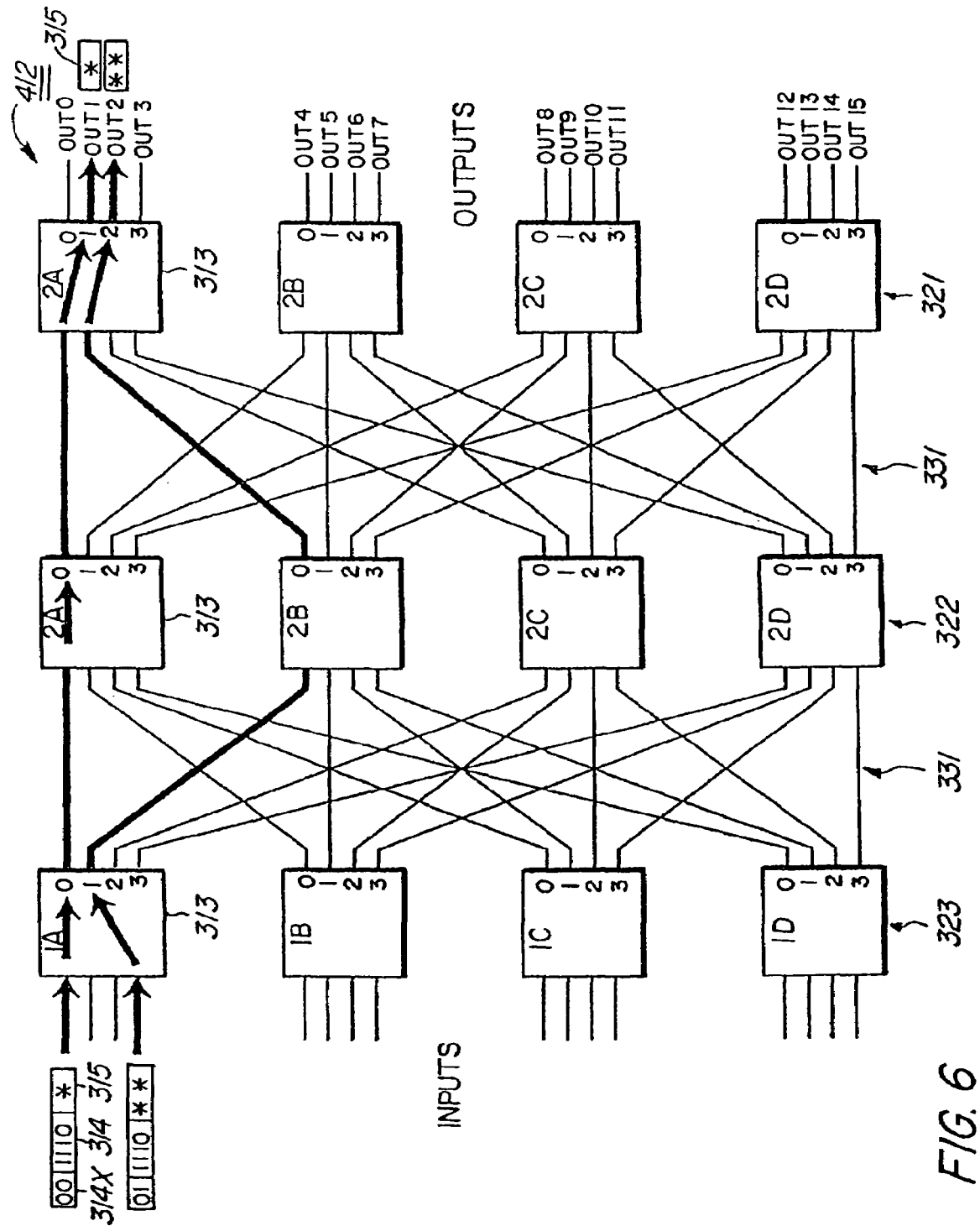
FIG. 6 is a block diagram of a 16-port switching network 412 formed from three-stages of 4.times.4 crossbar switching elements that reduces the internal blocking problem associated with the two-stage switching network 312 of FIG. 5.

The multi-stage switching network 100 of FIG. 7 has only two stacks 140, 160 such that it might correspond to the switching topology of FIG. 5. The network 100, however, could be easily modified to provide three or more stacks to implement any other desired switching topology such as that shown in FIG. 6 where each stack preferably corresponds to one of the columns.

Figure 1:
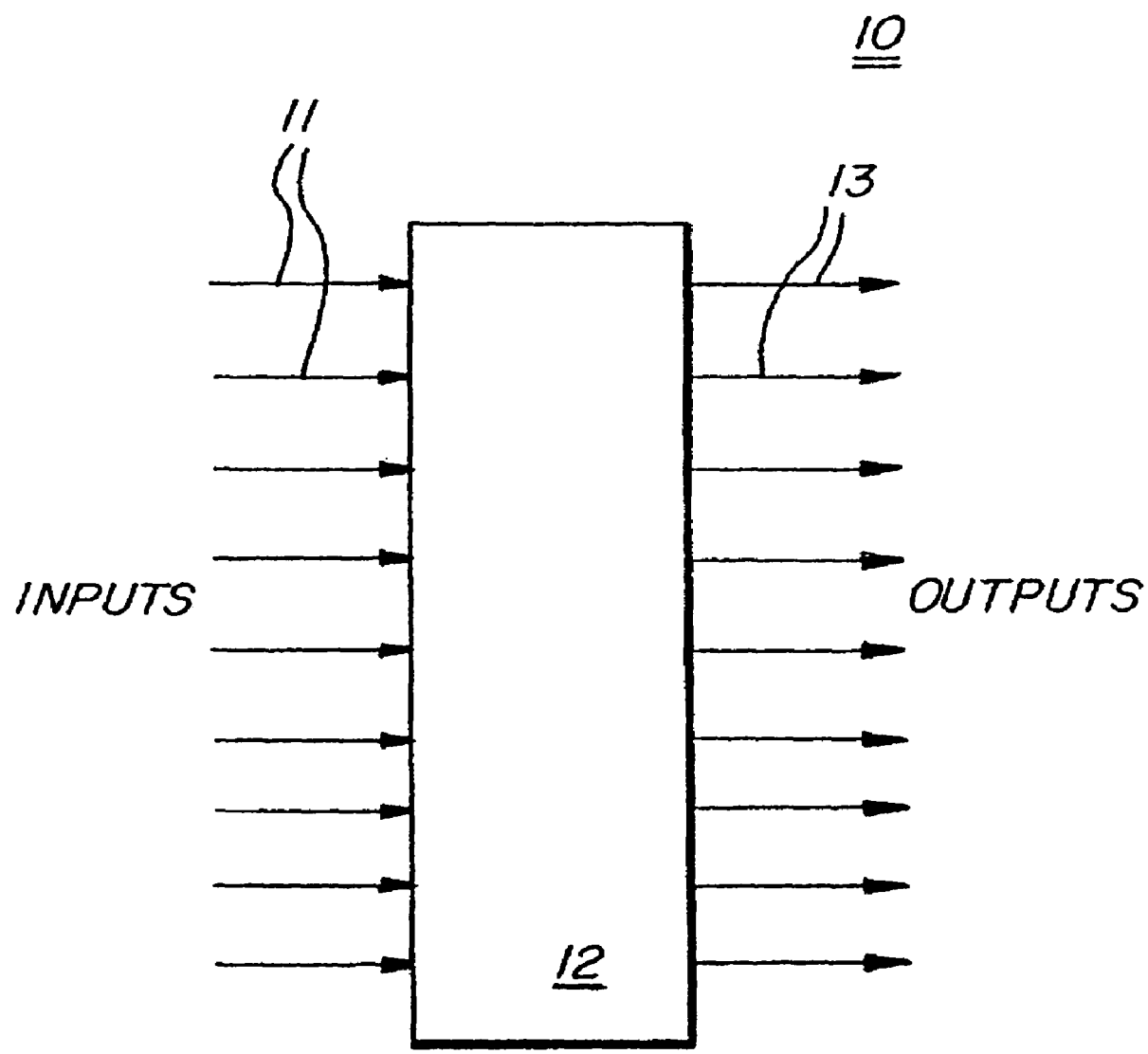
FIG. 1 is a simplified block diagram of a switch including inputs, outputs, and a switch fabric.

FIG. 8 is a simplified schematic view of an optical-electronic-optical (OEO) data switch built around the compact multi-stage switching network 100 of FIG. 1. As shown here, photonic data 201 as would be present on optical cables is interfaced to the electronic data input ports 110 through a suitable means 210 for converting photonic data to electronic data. Conversely, at the output side of the network 100, the electronic data output ports 190 are converted back to photonic data 202 via a suitable means 290 for converting electronic data to photonic data.

FIGS. 7 and 8 both include a means 150 for interconnecting the interface conductors of the first stack 140 of IC layers to the interface conductors of the second stack 160 of IC layers. There are numerous ways to accomplish this function as exemplified by FIGS. 9A, 9B and 9C.

Figures 1, 9A:
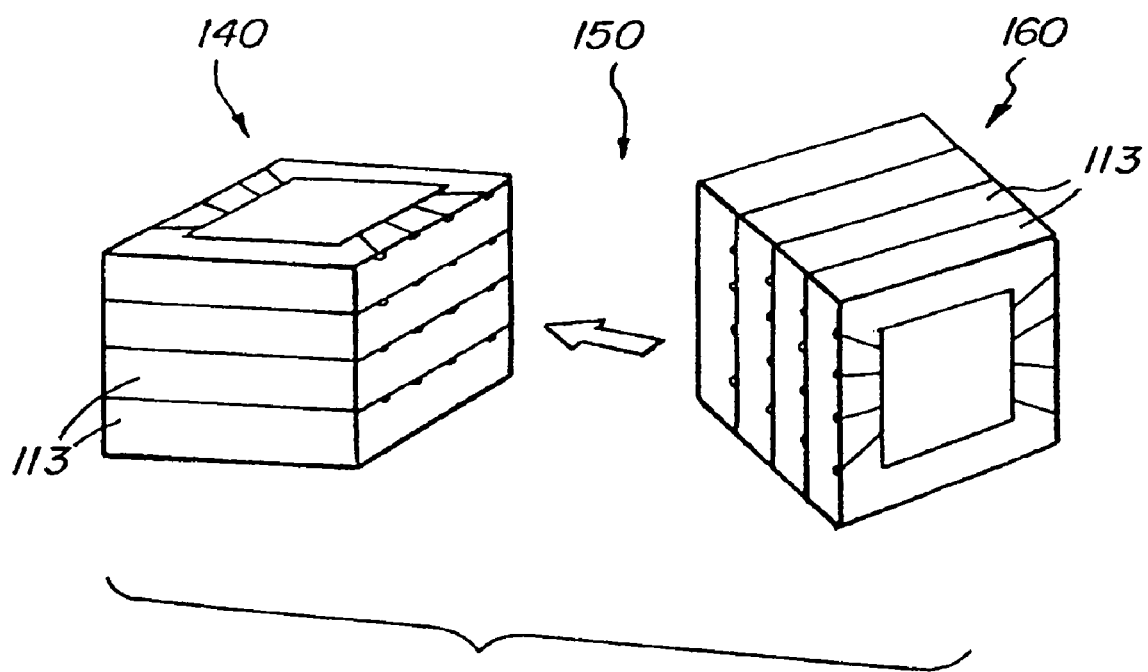
Figures 2, 9A:
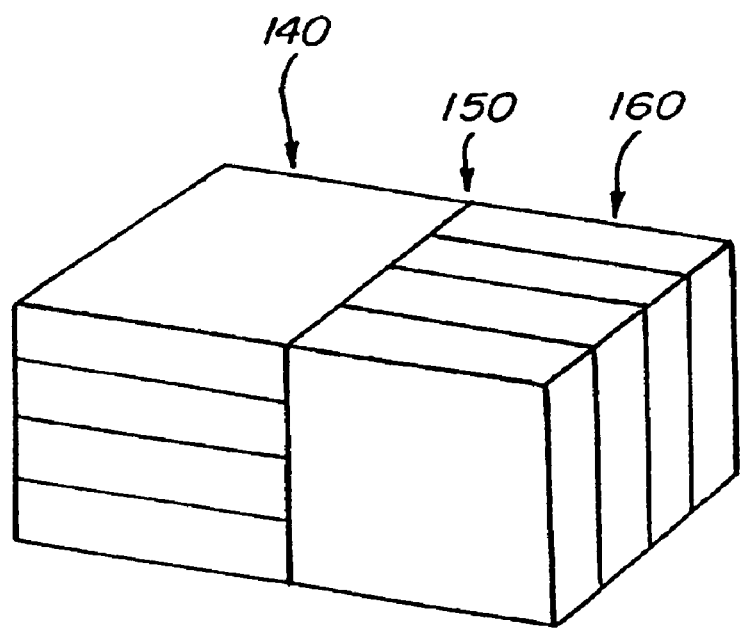

FIGS. 9A-1 is an exploded perspective view of a first preferred means 150 for interconnecting first and second stacks 140, 160 of IC switching layers consisting of a transverse mating between the stacks. In FIGS. 9A-1, the two stacks 140, 160 are separated to emphasize the structure and relative arrangement of the layers in the two stacks. The first stack 140 of IC layers has its switching layers 113 arranged in parallel, regarded as "horizontal" for the sake of description. The second stack 160 of IC Layers has its switching layers 113 arranged in parallel in a "vertical" orientation that is transverse to the layers of the first stack. Suitable bump bonds are formed on the sides of the stacks 140, 160 and spatially situated to contact one another when the stacks 140, 160 as suggested by the arrow leading from one stack to the other.

Figure 2:
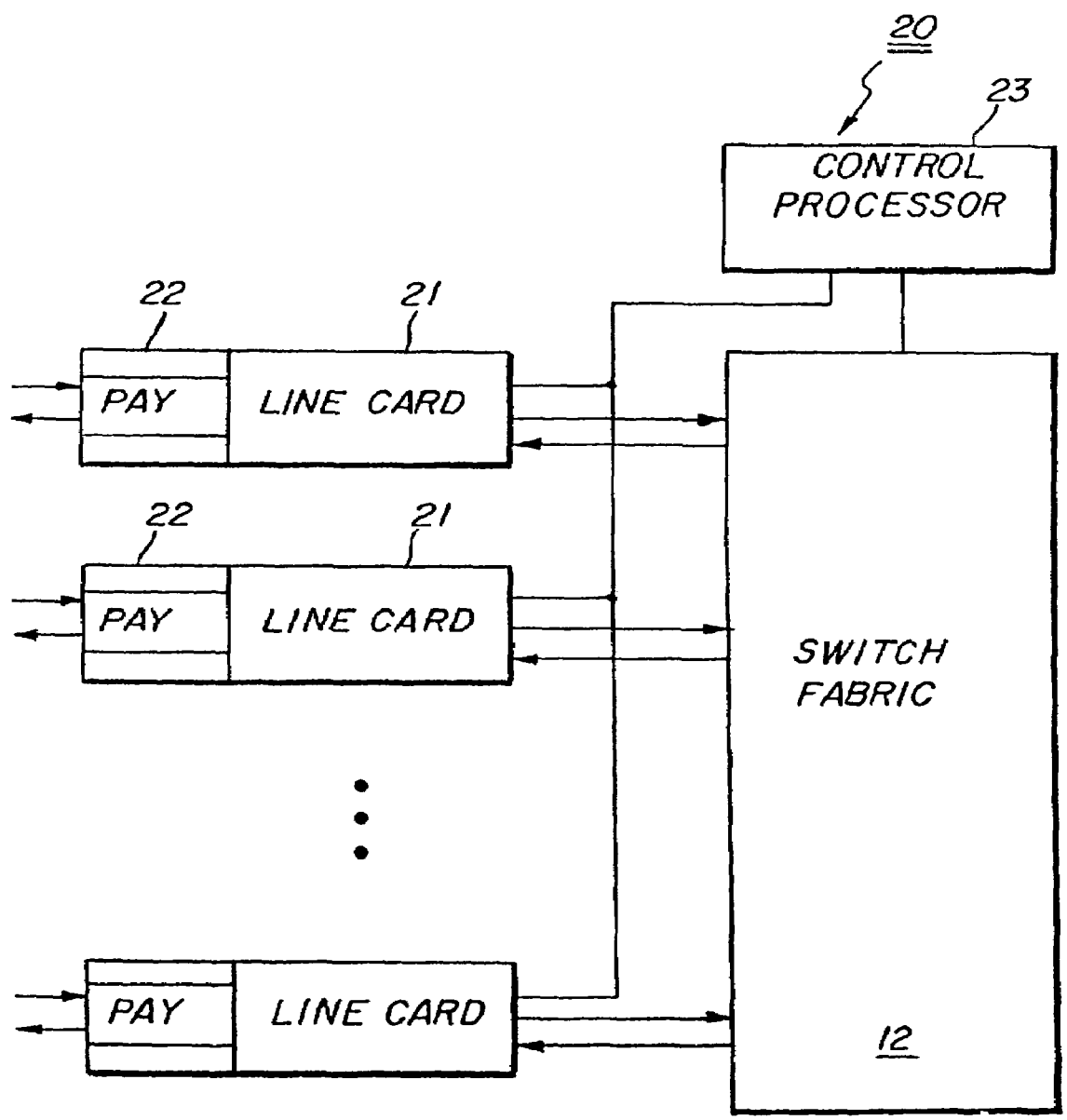
FIG. 2 is a simplified block diagram of a router that includes a plurality of line cards and a switch fabric.
Figure 3:
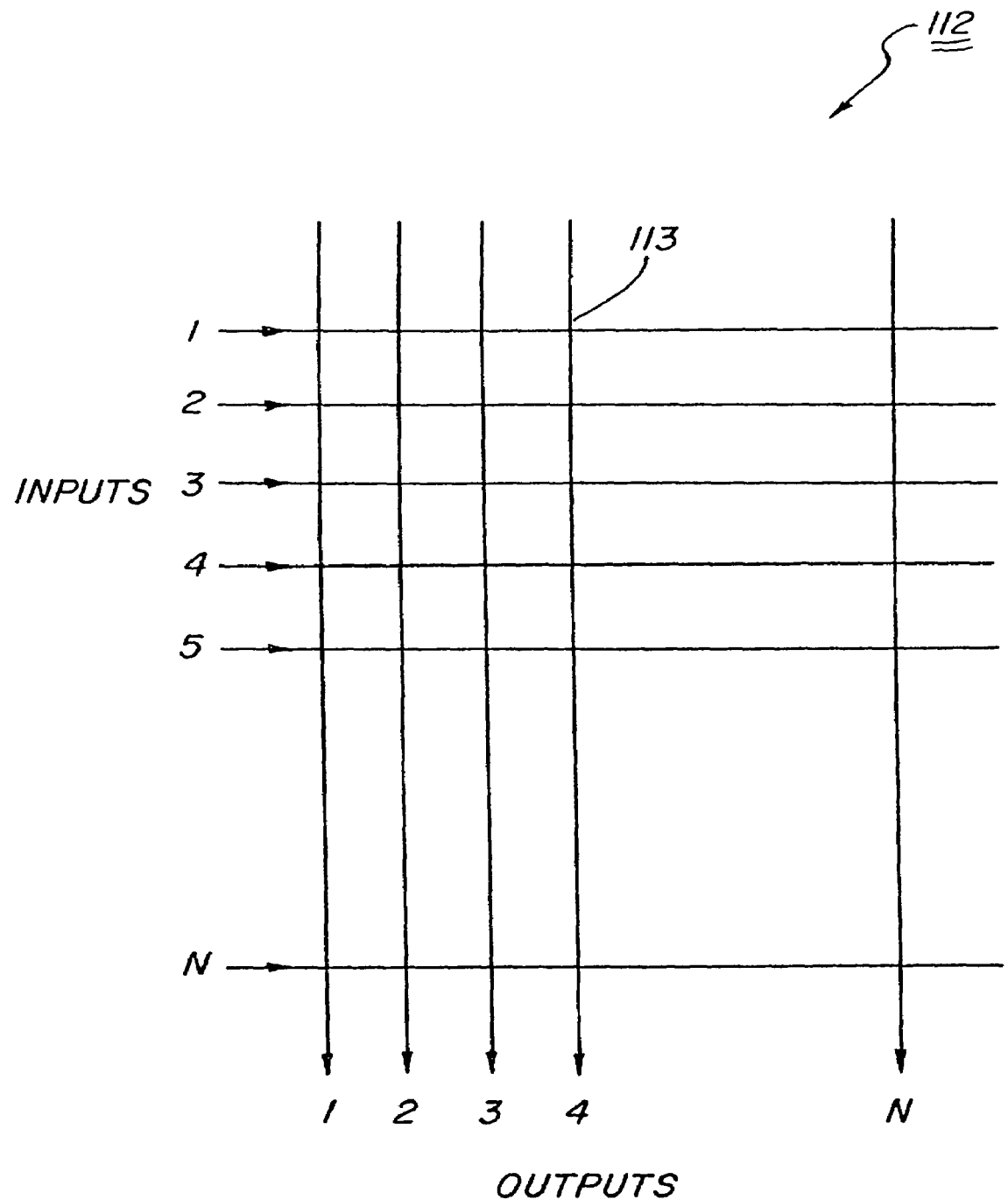
FIG. 3 is a simplified block diagram of an N.times.N crossbar switch 112 implemented in crosspoint arrangement.
Figure 4:
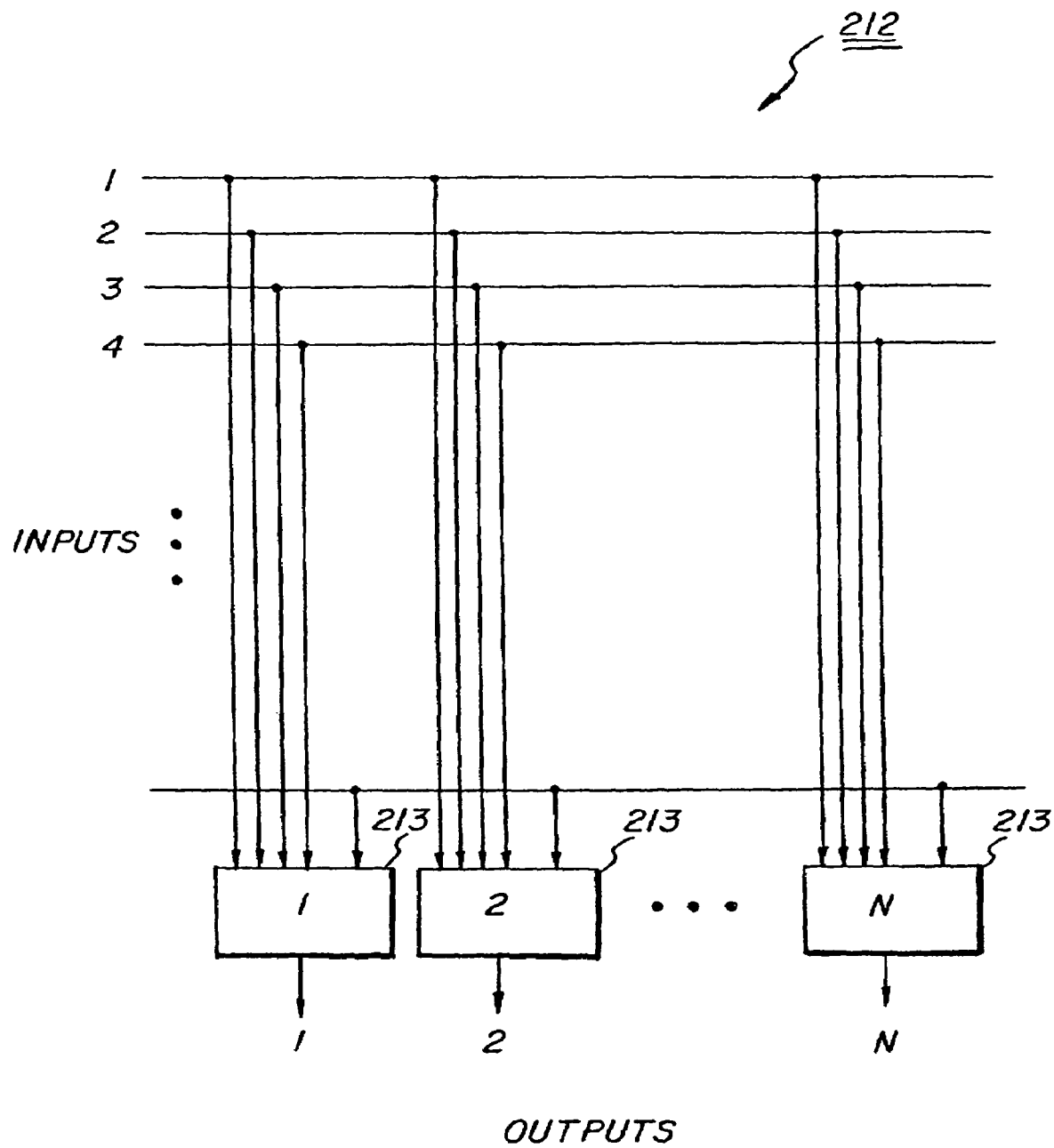
FIG. 4 is a simplified block diagram of an N.times.N crossbar switch 212 that uses multiple N-to-i demultiplexers 213.

FIGS. 9A-2 is a perspective view of a pair of transversely mated switching stacking 140, 160 according to the first preferred means 150 for interconnecting of FIGS. 3A-1. This transverse mating arrangement is considered advantageous in that it inherently implements a full-mesh interconnection topology 331 between the stacks that are precisely like that shown in the 2D embodiments of FIGS. 5 and 6.

Figure 9B:
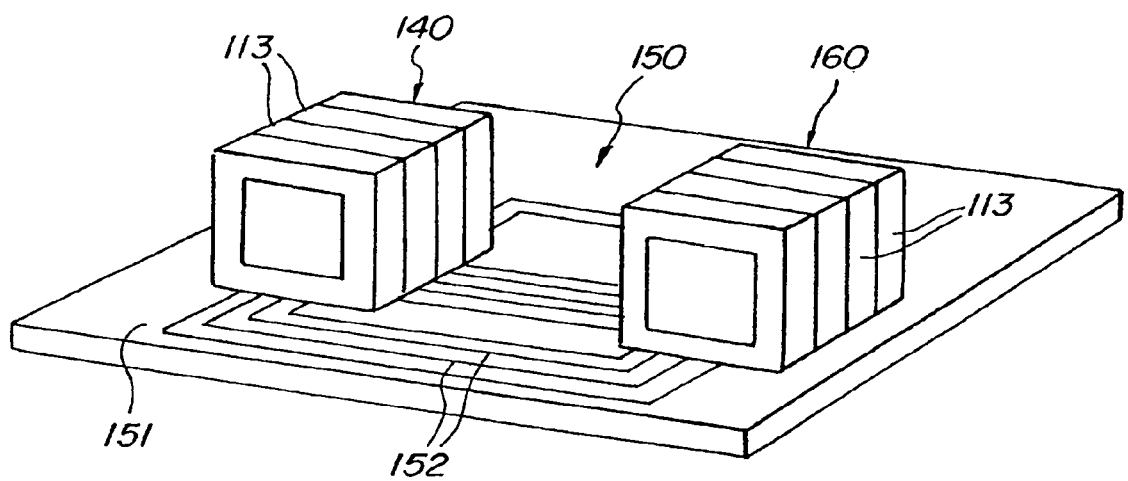
FIG. 9B is a perspective view of a second preferred means for interconnecting first and second stacks of IC switching layers where the layers are perpendicular to a common substrate and where the switching layers of each stack are connected to the switching layers of the other stack via edge conductors on each stack and suitable traces on the common substrate.

FIG. 9B is a perspective view of a second preferred means for interconnecting first and second stacks 140, 160 of IC switching layers where the layers 113 are oriented perpendicular to a common substrate 151 and where the switching layers 113 of each stack 140, 160 are connected to the switching layers 113 of the other stack 160, 140 via edge conductors (not shown) on each stack and suitable traces 152 on the common substrate 151.

Figure 9C:
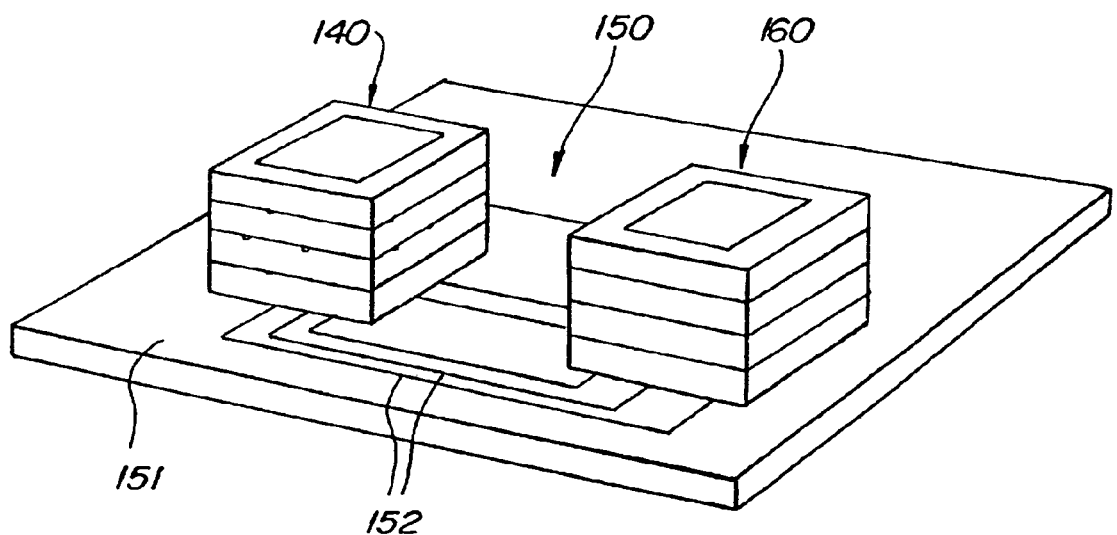
FIG. 9C is a perspective view of a third preferred means for interconnecting first and second stacks of IC switching layers where the layers are parallel to a common substrate and where the switching layers of each stack are connected to the switching layers of the other stack via area connections that rippled down through the layers and suitable traces on the common substrate.

FIG. 9C is a perspective view of a third preferred means 150 for interconnecting first and second stacks 140, 160 of IC switching layers 113 where the layers are situated parallel to a common substrate 151 and where the switching layers 113 of each stack are connected to the switching layers of the other stack via "area connections" that ripple down through the layers 113 to the bottom of each stack 140, 160 and suitable traces 152 on the common substrate 151.

The embodiments of FIGS. 9A, 9B and 9C show the least common denominator of only two stacks 140, 160 for the sake of simplicity, but the structures shown and their equivalents may be extended to multi-stage switching networks 100 formed from two or more stages, e.g. three. A three-stage network, for example, could be constructed to implement a "route around" network that is electrically comparable to the 2D network 412 of FIG. 6. In the preferred embodiment, each stage would be implemented as one stack as suggested by the two stacks corresponding to the two-stage embodiments of FIGS. 9A, 9B and 9C.

FIG. 10 is an exploded perspective view of a first preferred stack 140 of IC switching layers, each IC switching layer 113 being formed from an IC switching chip 142 that is encapsulated in a dielectric "neo-frame" and then processed to provide metallization 143 that renders the overall "neo-chip" or "new-layer" suitable for stacking. The process of creating such stackable "neo-chips" is fully disclosed in commonly assigned U.S. Pat. Nos. 5,953,588 and 5,279,991, the entire disclosures of which are hereby incorporated by reference. The presently preferred IC switching chips are 16.times.16 or 32.times.32 superconducting chips used in bare die form. Other than the desirability of using a superconducting chip for the high speed and low power benefits, however, the particular switching chip used does not form a material part of the present invention.

Figure 11:
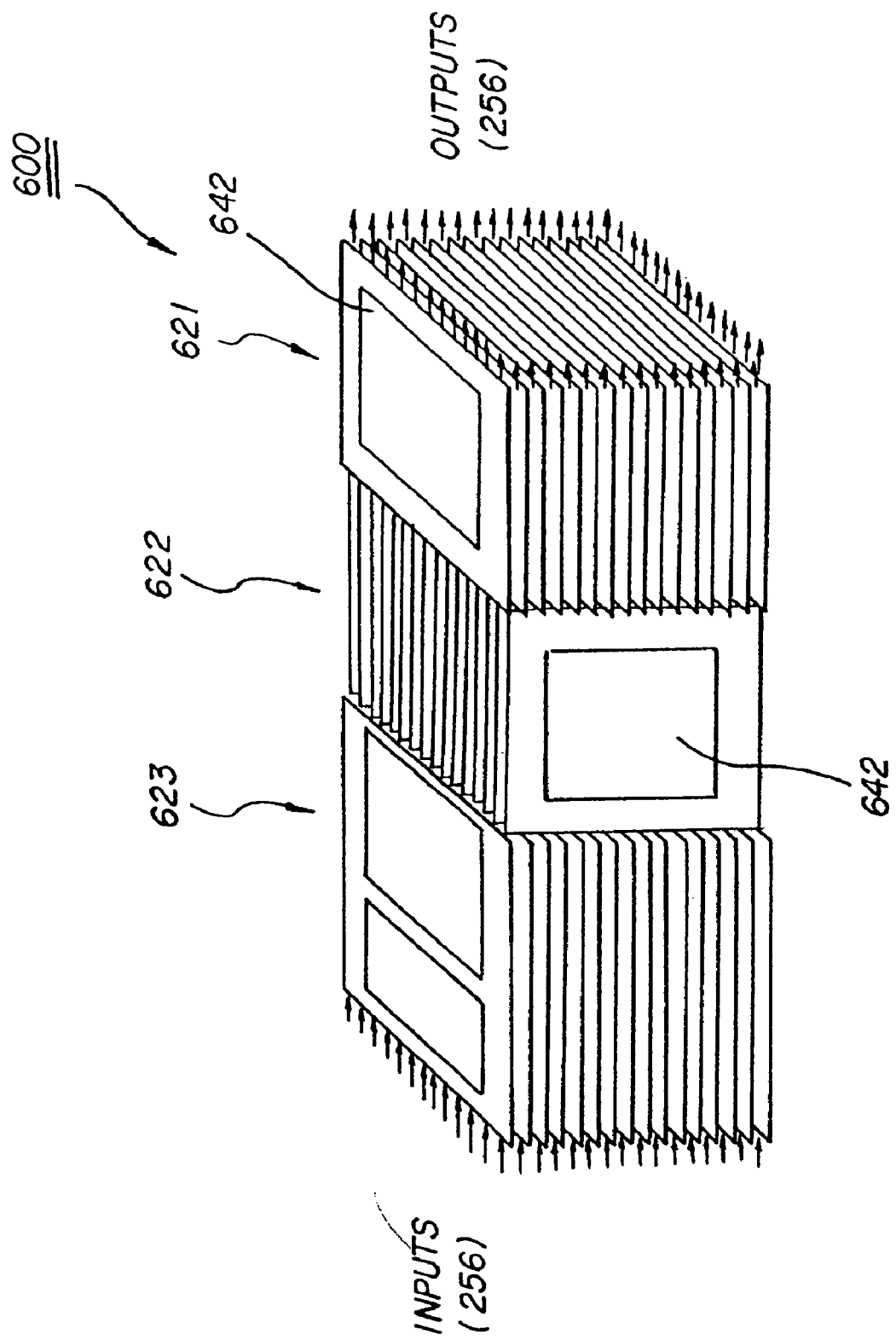
FIG. 11 is a perspective view of a presently preferred compact, three-stage switching network 600 according to this invention.

FIG. 11 is a perspective view of a presently preferred compact, three-stage switching network 600 according to this invention. In this embodiment, there are three stacks—two stacks of switch modules 621, 622 and one stack 623 of switch/scheduler modules. Each stack 621, 622 and 623 contains sixteen IC switching layers that have a crossbar chip 642. The switch/scheduler stack 623 includes suitable circuitry for implementing the controlled traversal of the switching network 600.

Figure 12:
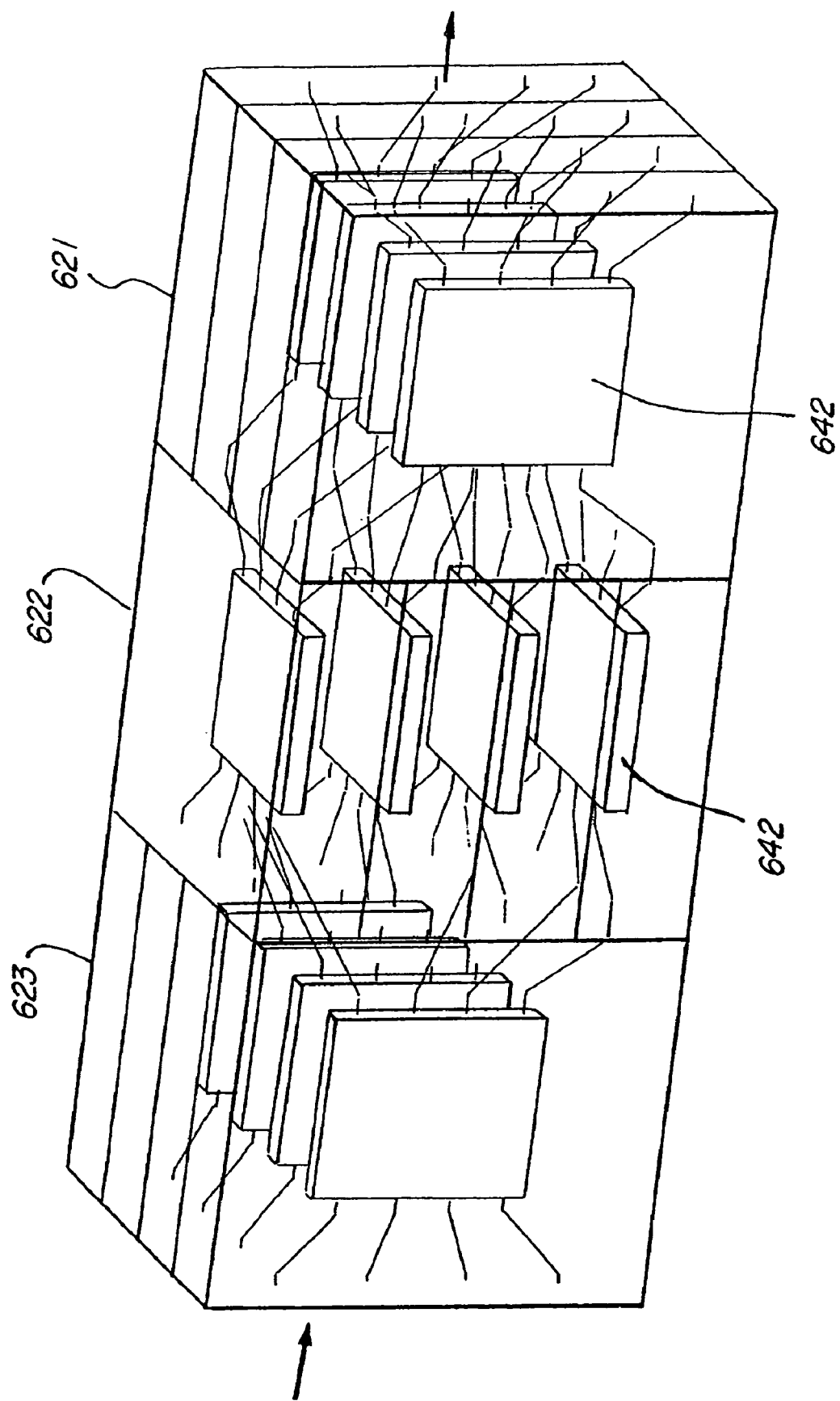
FIG. 12 is a simplified perspective view of the transverse connection between the three stacks 621, 622 and 623 (without the scheduler modules and reduced to a 4.times.4 case for simplicity)

FIG. 12 is a simplified perspective view of the transverse connection between the three stacks 621, 622 and 623 (without the scheduler modules and reduced to a 4.times.4 case for simplicity). As shown, the stacks 621, 622 and 623 are "crossed" or "transversely mated" with the two outer stacks 621, 623 oriented horizontally and the center stack 622 oriented vertically. With appropriate positioning of the signals on the edge of each stack, this allows direct implementation of a "full-mesh" interconnection between the three stacks to form a substantially non-blocking switching network.

Figure 13:
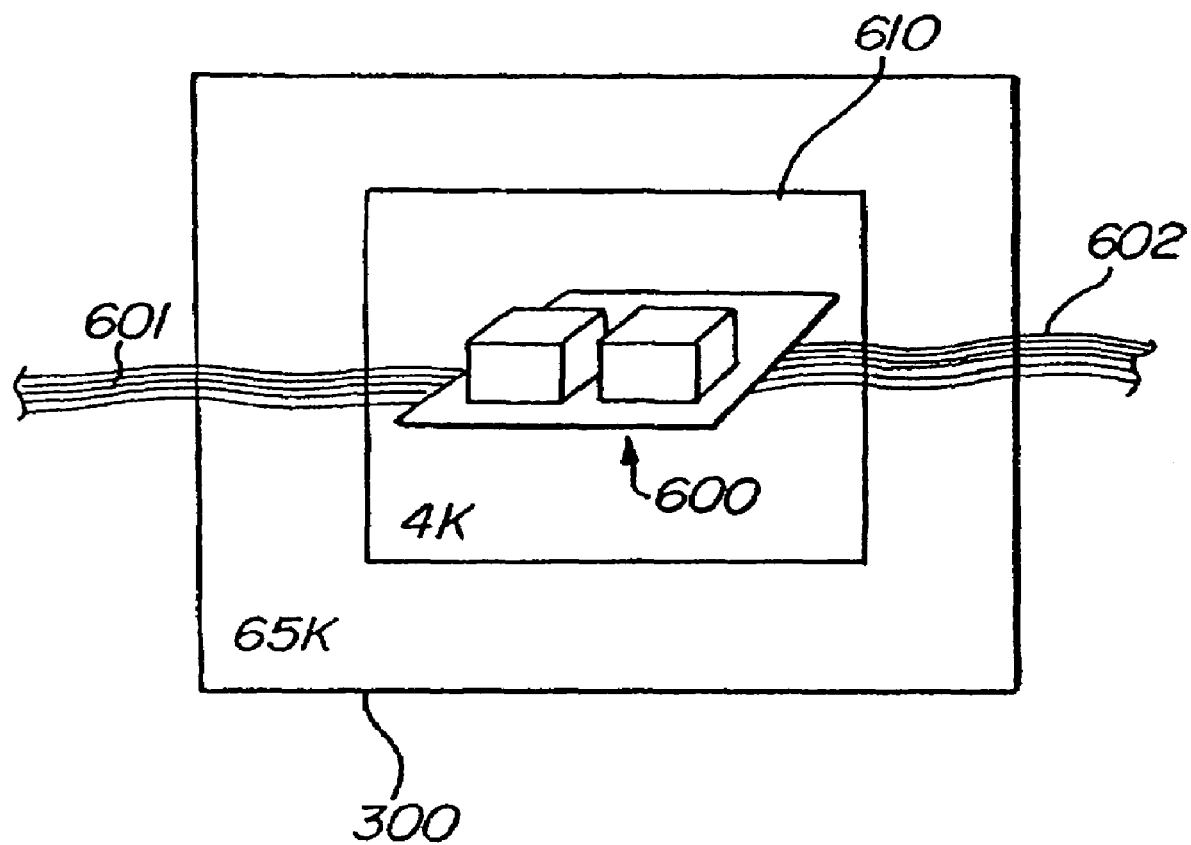
FIG. 13 illustrates a superconducting cooling embodiment enabled by the small size of compact switching network 600 made in accordance with this invention.

FIG. 13 illustrates another significant advantage of a switching network 600 made in accordance with this invention—namely the superconducting cooling options that are enabled by its compact size. In particular, in addition to making the signal lengths almost as short as is possible such that higher clock speeds may be attained, the compact configuration permits the switching network (e.g. 600) to be formed from switching chips that use superconducting technologies in that the compact stacks may be efficiently cooled to superconducting temperatures (e.g. 4 K) by encasing the switching network 600 within a suitable superconductive cooling means such as a cooling dewar 610 or a cryocooler and providing electrical or optical connections 601, 602 to the switching network 600 via the walls of the dewar 610. It is anticipated that a two-stage cooling system may be employed, as shown, where an outer chamber is cooled to a first low temperature (e.g. 65 K) and the inner chamber is cooled to a second even lower temperature (e.g. 4 K). It is also anticipated that the chamber or parts thereof provide electromagnetic insulation for the proper operation of the stacks.

Figure 14:
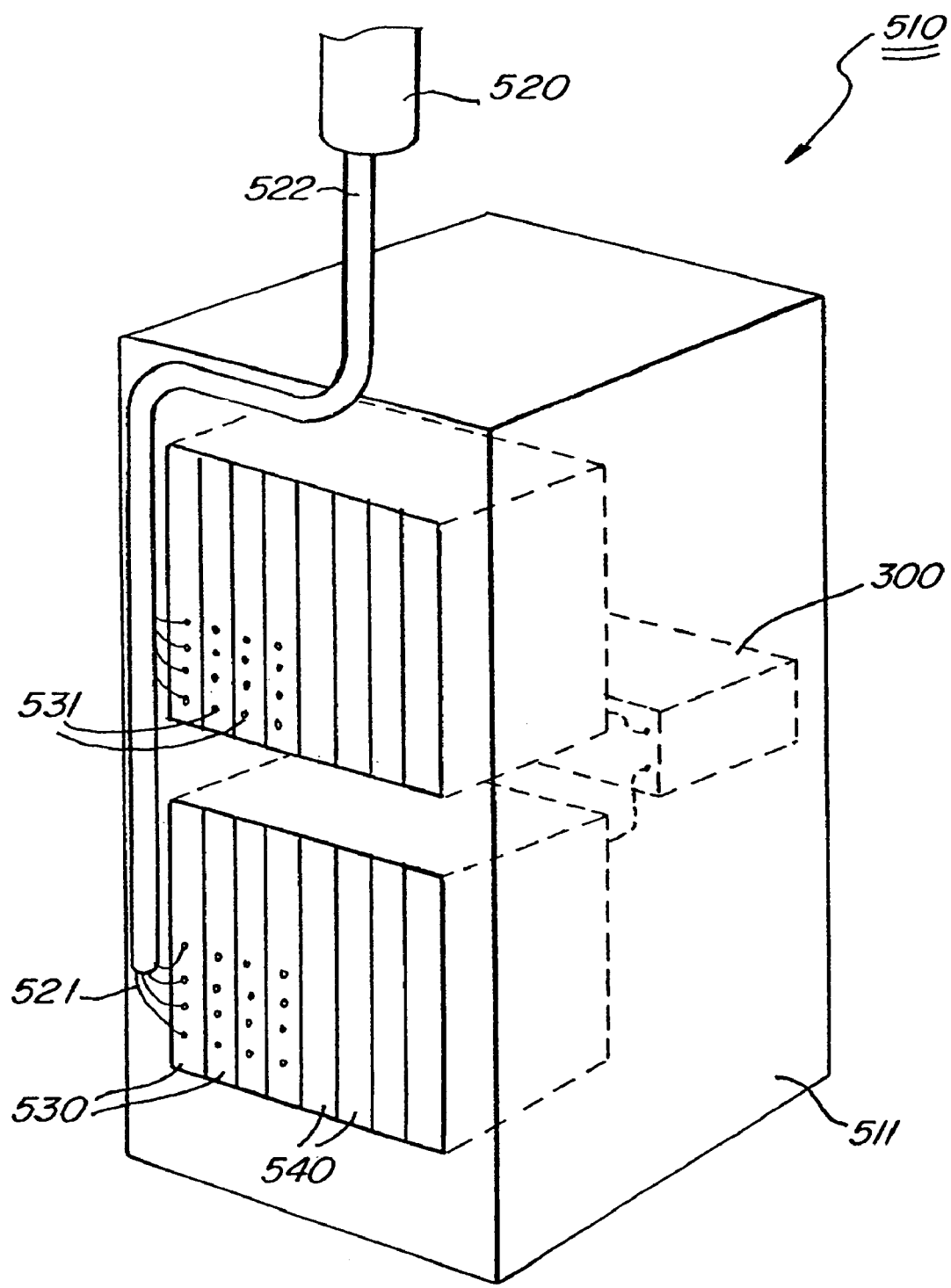
FIG. 14 shows a first preferred router 610 incorporating an electronic data switch 100 according to this invention.

FIG. 14 is a perspective view of a complete router 510 incorporating compact, multi-stage switching network according to this invention. The particular router shown has 16 fiber input ports and 16 fiber output ports, but more or less could be used in other embodiments.

A router 510 of this nature would likely be housed in an air conditioned room (not shown) and communication lines 521 would likely enter such room via conduit 520 opening into the room from the floor, ceiling, or walls. The communication lines 521 may be made of conductive metal (e.g. copper) or, as is assumed here, comprise optical fibers contained in fiber bundle 522. The optical fibers 521 will transmit data pursuant to a suitable signaling protocol such as Synchronous Optical Network (SONET) or Synchronous Digital Hierarchy (SDH), or any other suitable protocol.

The optical fibers 521 may also be part of a wavelength division multiplexing (WDM) network that makes fuller use of each fiber's capacity through the use of parallel signaling over different wavelengths. In more detail, WDM implements multiple channels on each fiber 521 through the simultaneous parallel use of multiple electrical-optical devices that transmit and receive through the same fiber on different wavelengths. The wavelengths of light that can be efficiently communicated in an optical fiber 521 are outside of the visible spectrum. Nonetheless, the different channels are often regarded as different "colors" because of the analogy to the different wavelengths associated with the different colors of visible light. Early WDM technology multiplexed 8 different colors into each fiber and so-called dense wavelength division multiplexing (DWDM) technology multiplexed 16 different colors into each fiber. The numbers are even higher today. It is assumed herein, however, that the each fiber is divided into 16 channels. As such, the 16 fiber input ports and 16 DWDM channels per port corresponds to 256 simultaneous inputs.

The presently preferred router 510 comprises a chassis 511 that is designed to receive standard-size rack-mounted modules. The modules used may vary as a function of implementation and capacity. In this particular case, however, the modules include line cards 530 support modules 540, and a supercooled switching module 300 like that of FIG. 13. As shown, the router 510 has eight line cards 530 with four I/O ports 531 each for a total of thirty-two routing ports 531, sixteen inbound and sixteen outbound. For the sake of brevity, the precise operation of the line cards 530 and their interaction with the other modules will not be described as routers are well described in the literature and the details of routing implementation are not a critical component of the present invention.

Figure 15:
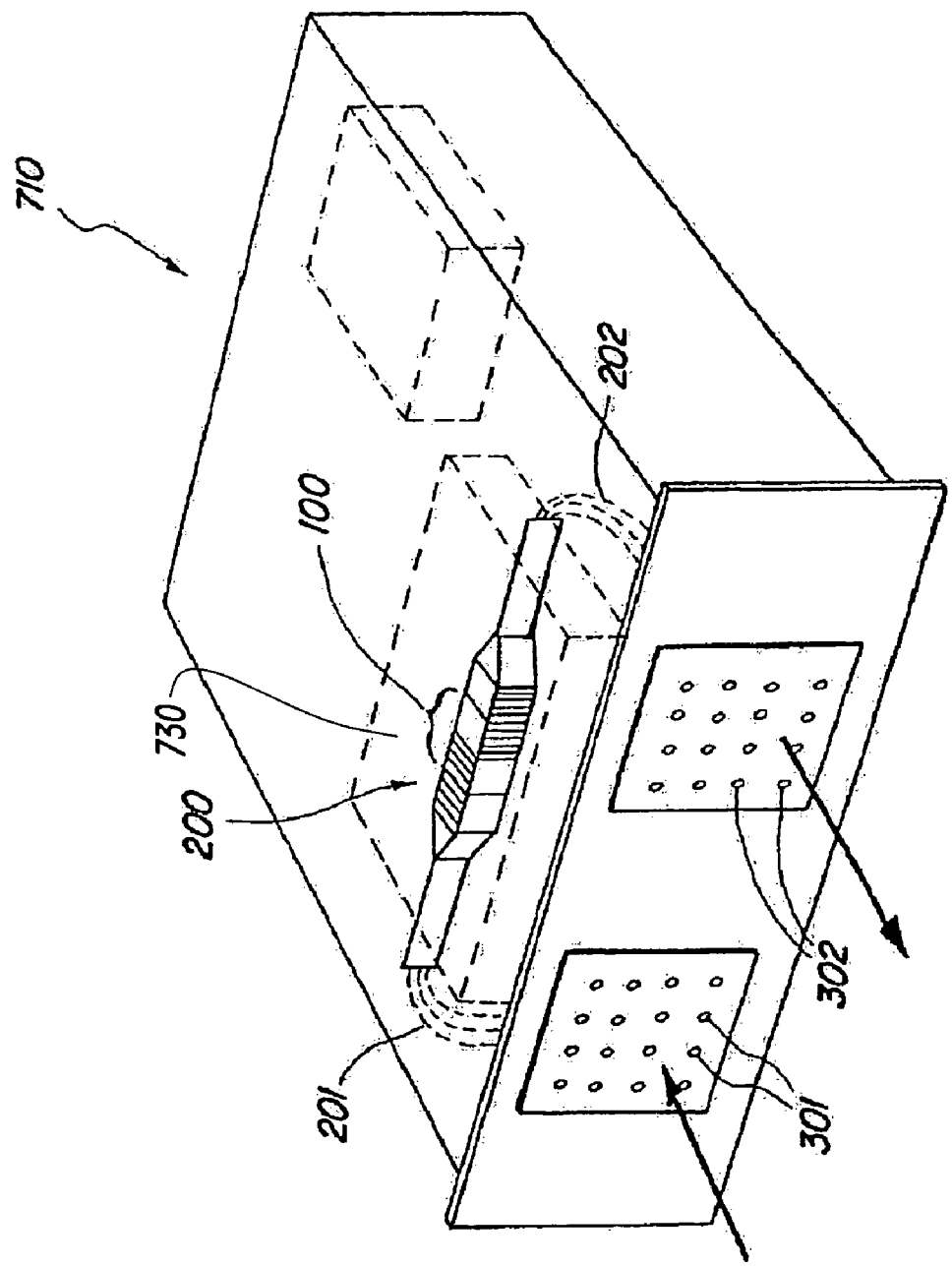
FIG. 15 shows a second preferred router 710 incorporating an optical-electronic-optical data switch 200 according to this invention.

In other words, any number of embodiments is possible. FIG. 15, for example, is a perspective view of second preferred router 710 that is extremely compact in size in that the optical fibers plug directly into the router 710 such that switching network, processing, and line cards are incorporated into one compact package. As shown, the router 710 contains an optical-electrical-optical (OEO) switching core 200 (see FIG. 8) that is contained with a cryogenic dewar 730, or other suitable cooling means, in order to operate at supercooled temperatures and that is connected directly to sixteen optical input ports 301 and sixteen output ports 302 via an input fiber bundle 201 and an output fiber bundle 202, respectively. The OEO switching core 200, of course, includes a compact, multi-stage switching network 100 according to this invention. A two-stage network 100 is shown, but it could be implemented with three or more stages as well.

Figure 16:
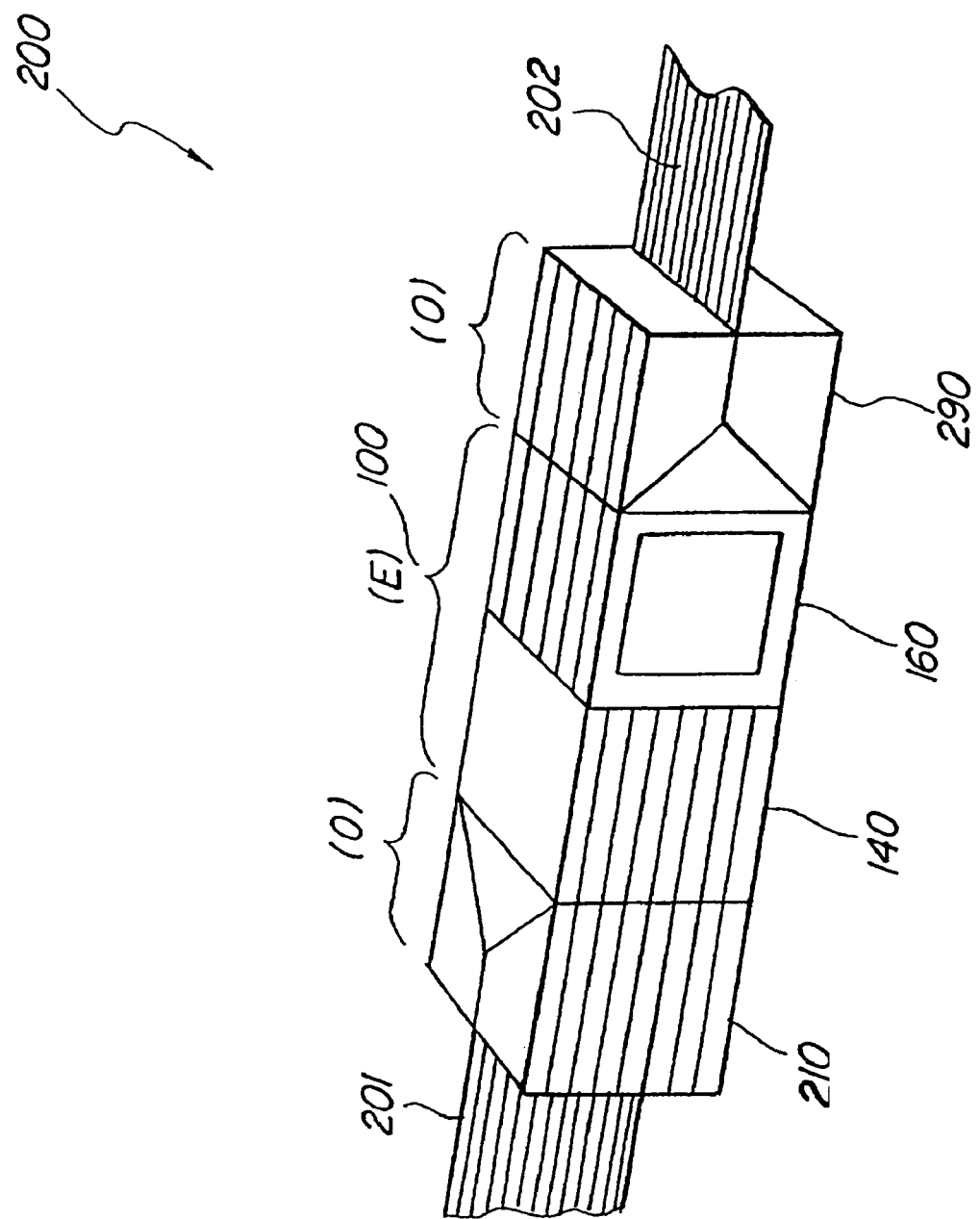
FIG. 16 illustrates the presently preferred OEO switching core 200 of the second preferred router 710 in more detail.

FIG. 16 illustrates the presently preferred embodiment of an OEO switching core 200 in more detail. As shown, the OEO switching core 200 includes an input buffer cube 210, an electronic multi-stage switching network 100, and an output buffer cube 200. Input and output fiber bundles 201, 202 are arranged as ribbon cables for convenient connection to the input and output buffer cubes 210, 290. In the preferred embodiment, the electronic multi-stage switching network 100 is comprised of superconducting switching layers, as discussed above, and the OEO switching core 200 is housed in a cryogenic cooling vessel 730 (see FIG. 15) in order to cool the data switch 100 to the temperature necessary for superconducting operation (e.g. 4K).

The input buffer cube 210 is implemented as stacked layers of WDM De-Mux (de-multiplexing) chips that each provides a photonic input, a waveguide grating for diffracting the incoming signals at different angles, and a suitable number of detector circuits for converting the individually diffracted WDM optical signals into electronic signals for traversing the switching network 100.

The output buffer cube 290 is implemented as the converse of the input buffer cube 210. In other words, it includes a photonic output and a transmitting laser array for converting the individual electronic signals back into WDM optical signals for transmission over an optical fiber.

Figure 17:
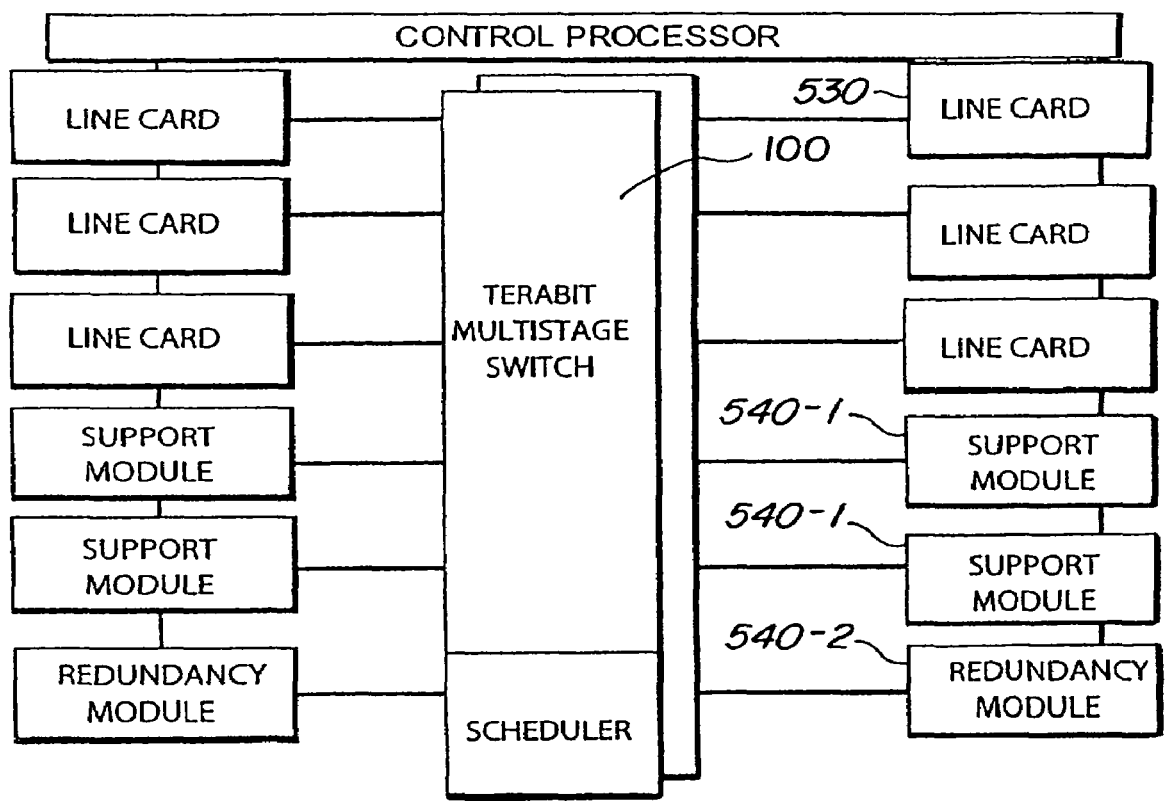
FIG. 17 shows a router that incorporates a multi-stage switching network according to this invention that, in accordance with a further preferred embodiment, offers more routing ports than are required for routing data from line card to line card such that common resources may be shared amongst the line cards via the extra routing ports of the switching network.

FIG. 17 illustrates another advantage of a compact multi-stage switching network according to this invention, i.e. the ready provision and use of more switching ports than is needed to merely route data from line card channel to line card channel. The provision of "extra" ports is made possible by the large number of ports that stem from the stacked construction. A compact multi-stage switching network according to this invention, for example, could provide 1,024 switched ports when only 256 are needed.

In a large-scale router of conventional construction, like that of FIG. 2, there is little or no sharing of resources. Each line card has its own dedicated microprocessor and its own dedicated input/output buffers to prevent blocking and dropped packets. Once a given line card's resources are fully utilized (e.g. one of its buffers is full), the line card cannot support any additional traffic even if the identical resources on an adjacent line card are unused.

The router of FIG. 17, by contrast, includes a compact multi-stage switching network 100 of stacked construction, according to this invention, that offers more switch ports than are needed to simply route data from line card 530 to line card 530. The additional routing ports in the switch fabric are available for uses other than pure routing. For example, common resources such as shared support modules (e.g. processing or buffering) 540-1 or redundancy modules 540-2 module may be uniquely shared amongst the line cards and dynamically accessed by individual line cards, via the extra ports through the stacked multi-stage switch fabric 100, on an as-needed basis.

Figure 18:
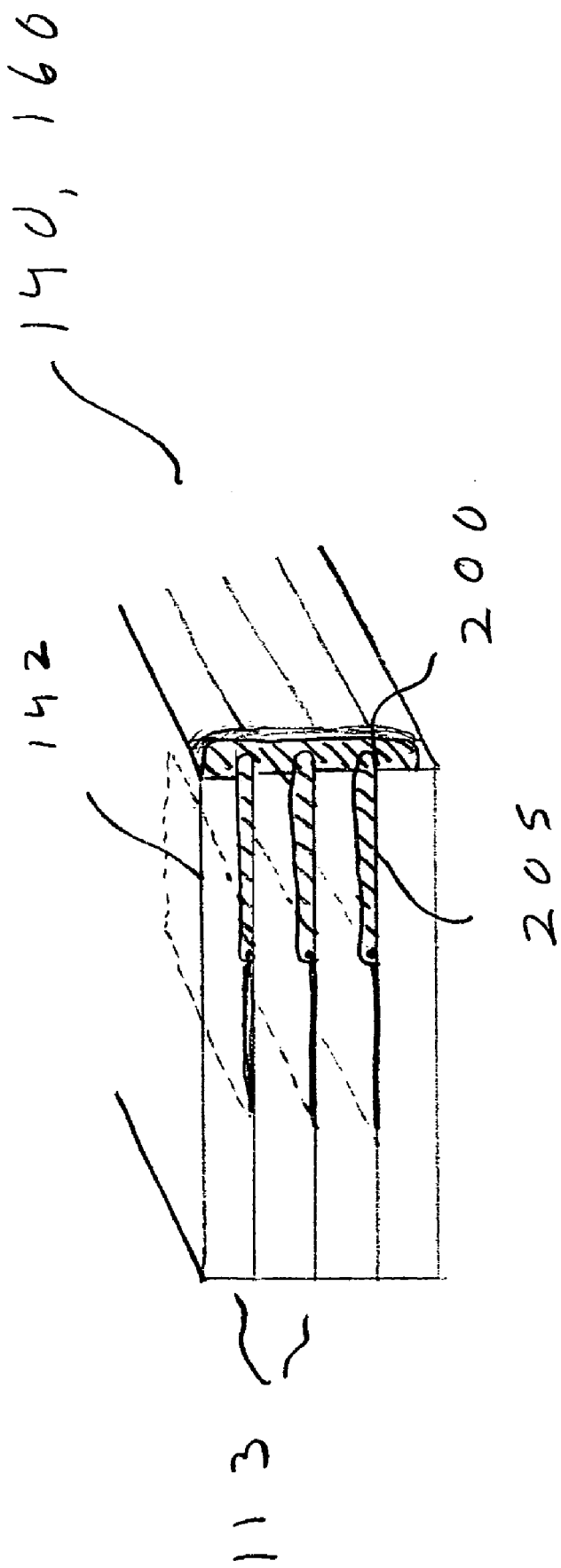
FIG. 18 is a cross-section of a stack of the present invention showing a metalized T-connect structure for the interconnection of IC switching elements in different IC switching layers.

In the alternative embodiment shown in the cross-section of FIG. 18, one or more switching element circuits 142 of different individual IC switching layers 113 may be interconnected using a metalized T-connect 200. The illustrated T-connect shown is greatly exaggerated and preferably has a metal layer thickness of 10 microns or less.

In this embodiment, individual I/O pads of switching element circuits 142 are routed to the edge of one or more IC switching layers 113 of a stack using metalized traces 205 to form a T-connect structure 200 as is disclosed, for instance, in U.S. Pat. Nos. 4,525,921; 4,646,128; 5,104,820 to Irvine Sensors Corp., each of which is fully incorporated by reference herein.

This embodiment has the advantage of providing very short interconnect lead length to minimize parasitic capacitance at high frequency operation, and to reduce time of flight within the module. The T-connect embodiment may desirably be incorporated into stacks 140, 160 comprising superconducting circuitry as well as conventional circuitry and using encapsulated or potted IC chips, modified prepackaged IC chips, or in the form of stacked bare die.

What is claimed is:

1. A compact multi-stage switching network configured to simultaneously route a plurality of data packets from a first plurality of input ports to selected ones of a second plurality of output ports comprising:

a first stack of IC layers including a plurality of IC switching layers that are stacked in physical contact with one another; each IC switching layer containing at least one switching element circuit wherein at least one of said switching element circuits in at least one of said IC switching layers of said first stack of IC layers is in electrical connection with at least one other of said switching element circuits in at least one other of said IC switching layers of said first stack of IC layers by means of a metalized T-connect;

a second stack of IC layers including a plurality of IC switching layers that are stacked in physical contact with one another, each IC switching layer containing at least one switching element circuit; wherein at least one of said switching element circuits in at least one of said IC switching layers of said second stack of IC layers is in electrical connection with at least one other of said switching element circuits in at least one other of said IC switching layers of said second stack of IC layers by means of a metalized T-connect structure; and means for interconnecting the first stack of IC layers to the second stack of IC layers to form the compact multi-stage switching network.

2. A compact multi-stage switching network configured to simultaneously route a plurality of data packets from a first plurality of input ports to selected ones of a second plurality of output ports comprising:

a first stack of IC layers including a plurality of IC switching layers that are stacked in physical contact with one another, each IC switching layer containing at least one switching element circuit;

a second stack of IC layers including a plurality of IC switching layers that are stacked in physical contact with one another, each IC switching layer containing at least one switching element circuit;

wherein at least one of said switching element circuits in at least one of said IC switching layers of said first stack of IC layers is in electrical connection with at least one of said switching element circuits in at least one other of said IC switching layers of said second stack of IC layers by means of a metalized T-connect structure; and means for interconnecting said first stack of IC layers to said second stack of IC layers to form said compact multi-stage switching network.

3. A compact multi-stage switching network configured to simultaneously route a plurality of data packets from a first plurality of input ports to selected ones of a second plurality of output ports comprising:

a first stack of layers including a plurality of superconducting switching layers that are stacked in physical contact with one another, each superconducting switching layer containing at least one superconducting switching element circuit wherein at least one of said superconducting switching element circuits in at least one of said superconducting switching layers of said first stack of layers is in electrical connection with at least one other of said superconducting switching element circuits in at least one other of said superconducting switching layers of said first stack of layers by means of a metalized T-connect;

a second stack of layers including a plurality of superconducting switching layers that are stacked in physical contact with one another, each superconducting switching layer containing at least one superconducting switching element circuit wherein at least one of said superconducting switching element circuits in at least one of said superconducting switching layers of said second stack of layers is in electrical connection with at least one other of said superconducting switching element circuits in at least one other of said superconducting switching layers of said second stack of layers by means of a metalized T-connect;

means for interconnecting said first stack of layers to the second stack of layers to form a compact assembly; and means for cooling the compact assembly to a superconducting temperature.

* * * * *